(12) United States Patent
Christophersen

(10) Patent No.: US 8,929,378 B2
(45) Date of Patent: Jan. 6, 2015

(54) APPARATUS FOR ANALYZING A DATA PACKET, A DATA PACKET PROCESSING SYSTEM AND A METHOD

(75) Inventor: Jens Christophersen, Virum (DK)

(73) Assignee: Napatech A/S, Soberg (DK)

( * ) Notice: Subject to any disclaimer, the term of this patent is extended or adjusted under 35 U.S.C. 154(b) by 160 days.

(21) Appl. No.: 13/496,013

(22) PCT Filed: Sep. 15, 2010

(86) PCT No.: PCT/EP2010/063508
§ 371 (c)(1),
(2), (4) Date: Mar. 16, 2012

(87) PCT Pub. No.: WO2011/032954
PCT Pub. Date: Mar. 24, 2011

(65) Prior Publication Data
US 2012/0170584 A1    Jul. 5, 2012

Related U.S. Application Data

(60) Provisional application No. 61/242,567, filed on Sep. 15, 2009.

(51) Int. Cl.
*H04L 12/28* (2006.01)
*H04L 12/801* (2013.01)
*H04L 12/721* (2013.01)
*H04L 12/741* (2013.01)
*H04L 12/803* (2013.01)
*H04L 12/851* (2013.01)
*H04L 12/935* (2013.01)
*H04L 29/06* (2006.01)

(52) U.S. Cl.
CPC ............... *H04L 47/10* (2013.01); *H04L 45/38* (2013.01); *H04L 45/745* (2013.01); *H04L 47/125* (2013.01); *H04L 47/2441* (2013.01); *H04L 49/3009* (2013.01); *H04L 69/22* (2013.01); *H04L 69/12* (2013.01)
USPC .......................................................... 370/392

(58) Field of Classification Search
CPC ...................................................... H04L 45/00
USPC ................................... 370/235, 392, 395.32
See application file for complete search history.

(56) References Cited

U.S. PATENT DOCUMENTS 6,597,661 B1 * 7/2003 Bonn ............................ 370/235
7,212,526 B2 * 5/2007 Kanetake ..................... 370/386
(Continued)

FOREIGN PATENT DOCUMENTS

WO        2009099573 A1    8/2009

OTHER PUBLICATIONS

Patent Cooperation Treaty, International Search Report by Authorized Officer Stefano Ramenzoni at the European Patent Office (as Searching Authority), mailed Dec. 27, 2010; pp. 1-12.

(Continued)

*Primary Examiner* — Hassan Kizou
*Assistant Examiner* — Abdullahi Ahmed
(74) *Attorney, Agent, or Firm* — McHale & Slavin, P.A.

(57) ABSTRACT

An apparatus and method for analyzing a data packet, where the first and second information is derived relating to the data packet. The first information relates to a type of the data packet, a standard to which the data packet conforms and/or which data item(s) is/are present in the data packet. The first information is used for identifying a function into which the second information is input to generate third, and this third information is output together with at least part of the data packet.

14 Claims, 7 Drawing Sheets

(56) References Cited

U.S. PATENT DOCUMENTS

Figure 1:
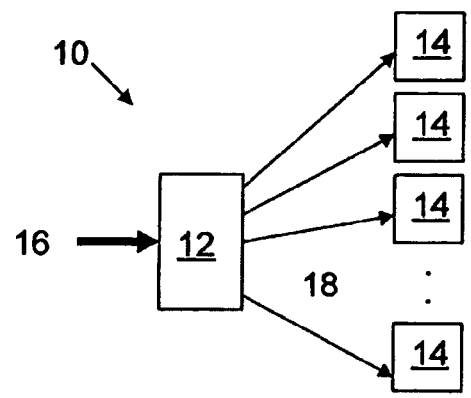

| | | | |
|---|---|---|---|
| 7,529,242 B1* | 5/2009 | Lyle | 370/392 |
| 7,596,141 B2* | 9/2009 | Basu et al. | 370/392 |
| 7,706,291 B2* | 4/2010 | Luft et al. | 370/246 |
| 7,773,510 B2* | 8/2010 | Back et al. | 370/230 |
| 7,948,980 B2* | 5/2011 | Lu et al. | 370/389 |
| 8,098,578 B1* | 1/2012 | Shah et al. | 370/230 |
| 8,374,102 B2* | 2/2013 | Luft et al. | 370/253 |
| 8,503,456 B2* | 8/2013 | Matthews et al. | 370/395.32 |
| 2003/0063611 A1* | 4/2003 | Schaub et al. | 370/395.32 |
| 2003/0067930 A1* | 4/2003 | Salapura et al. | 370/412 |
| 2005/0254502 A1* | 11/2005 | Choi | 370/395.32 |
| 2007/0168377 A1* | 7/2007 | Zabarsky | 707/102 |
| 2008/0198867 A1* | 8/2008 | Moll et al. | 370/419 |
| 2009/0006521 A1* | 1/2009 | Veal et al. | 709/201 |

OTHER PUBLICATIONS

Patent Cooperation Treaty, International Preliminary Report on Patentability by Authorized Officer Marlene Schur at the European Patent Office (as the International Preliminary Examining Authority), mailed Dec. 30, 2011; pp. 1-7.

Accolade Technology, Inc., http://accoladetechnology.com/features; pp. 1-2, website last visited May 30, 2011.

Intel Corporation, 82599 10 Gigabit Ethernet Controller Datasheet—Inline Functions; Revision 2.74—Feb. 2012; pp. 1-4.

* cited by examiner

Figure 5

| Hash modes | word 6 | | | word 2 | | | word 1 | | word 0 | |
|---|---|---|---|---|---|---|---|---|---|---|
| | 223 192 | 191 127 | | 96 95 | | 64 63 | | 32 31 | | 0 |
| Type 0: Hash disable | Not used | Not used | | Not used | | Not used | | Not used | | |
| Type 1: Reserved | Not used | Not used | | Not used | | Not used | | Not used | | |
| Type 2: Last MPLS | zero | zero | | zero | | zero | | zero | 20 19 | Last MPLS |
| Type 3: All MPLS | 212 211 MPLS_6 | 180 179 zero | 160 MPLS_5 | 84 83 zero | MPLS_2 | 52 51 zero | MPLS_1 | zero | 20 19 | MPLS_0 |
| Type 4: 2-tuple | zero | zero | | zero | | IPv4 destination address | | IPv4 source address | | |
| Type 5: 2-tuple (sorted) | zero | zero | | zero | | IPv4 min address | | IPv4 max address | | |
| Type 6: Last VLAN | zero | zero | | zero | | zero | 44 43 | zero | 12 11 | Last VLAN |
| Type 7: All VLAN | zero | zero | | zero | 56 55 VLAN_2 | zero | VLAN_1 | zero | 12 11 | VLAN_0 |
| Type 8: 5-tuple | zero | zero | 104 103 prot. | 80 79 TCP/UDP/SCTP dest. port | TCP/UDP/SCTP source port | IPv4 destination address | | IPv4 source address | | |
| Type 9: 5-tuple (sorted) | zero | zero | 104 103 prot. | 80 79 TCP/UDP/SCTP port | TCP/UDP/SCTP port | IPv4 min address | | IPv4 max address | | |
| Type 10: 3-tuple GREv0 | zero | zero | | 80 79 GRE_KEY | GRE_KEY | IPv4 destination address | | IPv4 source address | | |
| Type 11: 3-tuple GREv0 (sorted) | zero | zero | | 80 79 GRE_KEY | GRE_KEY | IPv4 min address | | IPv4 max address | | |
| Type 12: 5-tuple SCTP | zero | SCTP Verification tag | | 80 79 SCTP dest. port | SCTP source port | IPv4 destination address | | IPv4 source address | | |
| Type 13: 5-tuple SCTP (sorted) | zero | SCTP Verification tag | | 80 79 SCTP port | SCTP port | IPv4 min address | | IPv4 max address | | |
| Type 14: 3-tuple GTPv0 | zero | zero | | 80 79 zero | Flow_label | IPv4 destination address | | IPv4 source address | | |
| Type 15: 3-tuple GTPv0 (sorted) | zero | zero | | 80 79 zero | Flow_label | IPv4 min address | | IPv4 max address | | |
| Type 16: 3-tuple GTPv1v2 | zero | zero | | GTP_TEID | | IPv4 destination address | | IPv4 source address | | |
| Type 17: 3-tuple GTPv1v2 (sorted) | zero | zero | | GTP_TEID | | IPv4 min address | | IPv4 max address | | |
| Type 31: Round-robin mode | Not used | Not used | | Not used | | Not used | | Not used | | |

APPARATUS FOR ANALYZING A DATA PACKET, A DATA PACKET PROCESSING SYSTEM AND A METHOD

CROSS-REFERENCE TO RELATED APPLICATIONS

This application is a §371 national stage entry of International Application No. PCT/EP2010/063508, filed Sep. 15, 2010, which claims priority to U.S. Provisional Patent Application No. 61/242,567 filed Sep. 15, 2009, the entire contents of which are incorporated herein by reference.

The present invention relates to processing of data packets and in particular to pre-processing of data packets received on a data connection and to be further processed by a plurality of processors.

Hitherto, such pre-processing has been rather rudimentary and a large part of the processing is left to the subsequent processors. Typically, this pre-processing is the determination of an overall type of data packet, such as a determination of one or more encapsulations (MPLS, VLAN or the like) and/or a data type (UDP, TCP or the like) and the forwarding of the data packet with this information. Alternatively, certain types of data packets may be pre-processed by deriving certain information therefrom (typically from the address fields of the data packet) and derive a hash value therefrom, which hash value is forwarded with the data packet. In the latter situation, individual streams of e.g. UDP/TCP traffic or VoIP may be identified from the hash value and be routed to the same processor if desired. However, only a single hash function is used, whereby only some types of data packets may be pre-processed. Other types of data packets have then not been pre-processed at all.

Systems of this type may be seen in WO200999573, U.S. Pat. No. 7,529,242, US2007168377, U.S. Pat. Nos. 7,212,526 or 6,597,661.

Thus, it is desired to provide more processing early in the data chain and in hardware as opposed to later and in software.

In a first aspect, the invention relates to an apparatus for analyzing a data packet, the apparatus comprising:
 means for accessing data of the data packet and outputting first and second information relating to the data packet,
 means for, on the basis of the first information, selecting one of a plurality of predetermined functions,
 means for deriving third information by applying the selected function to the second information, and
 means for outputting the third information together with at least part of the data packet
wherein the accessing means is adapted to output the first information relating to a type of the data packet, a standard to which the data packet conforms and/or which data item(s) is/are present in the data packet.

In the present context, an analysis may be a determination of certain values, situations, types, identities, or the like from data contained in the data packet. An analysis may or may not result in an altering of contents of the data packet, and any type of information in or of the data packet may be used.

Also, a data packet may be any type of a data unit to be transmitted on or transported by a network, data cable, data bus, trunk, or the like. Normally, a data unit conforms to one or more data standards, such as the Ethernet standard being an umbrella under which a number of different standards or data packet types exist, such as UDP and TCP data packets. A data packet usually has a number of different information items or types, such as address data, payload or the like, which are each positioned at well defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in the analysis.

In the present context, data may be accessed by actually receiving and/or storing the data or data packet. Alternatively, the data packet may be received or stored at another position or in an apparatus with which the present apparatus communicates, whereby the data of the data packet is accessed remotely by reading the data while stored in the other apparatus.

Also the second information may be any type of data derived from and/or relating to the data packet. The first information and such second information may be data/information directly copied or read from the data packet or may be data relating to e.g. a type of data packet or a standard to which the data packet conforms. The type or standard may be derived directly from the data packet, such as when a particular data item of the packet identifies the type/standard, or may be derived from data derived from the data packet, such as on the basis of recognition of types and positions of data items of the data packet and subsequently determination of type(s) or standard(s) of data packet in which such data may be found at such position(s).

The first and second information may be identical data (and thus derived or accessed only a single time) or may be different information. When the first information relates to a type of data packet or a standard to which the data packet conforms, the function is determined or selected on the basis of the type of data packet and/or which data item(s) is/are present in the data packet for use in the identified function.

The second information may then be data particular for that type of data packet. Preferably, the second data is selected so that data packets of a single stream have the same second information, whereas data packets of other streams have other second information.

A stream of data packets normally is a sequence of data packets transmitted from a single transmitter to one or more receivers. These data packets relate to e.g. a single file or the like transmitted in smaller portions, being the payload of the packets. The transmitter and receiver, or any intermediate network elements, will usually then have addresses also represented in the packet. In addition, other stream identifying information may be present in the data packet, depending on the individual data packet standard.

Thus, a stream may be identified on the basis of e.g. the addresses and/or the stream identifying information, whereby, if used consistently, the same third information may be provided, and any subsequent process may identify the stream merely from the third information.

Even though any type of function may in principle be used for any type of data packet, the invention relates to the selection between multiple functions so that different functions may be used or selected in different situations. Thus, different first information may result in the selection of different functions. This makes sense, as one or more of the functions may then be performed on second information which is not present in all data packets or all types of data packets. An example is that a function performed on a.o. a data packet with an MPLS or a VLAN tag is not suitable for data packets which are not MPLS or VLAN tagged.

In this respect, a function may be any mathematical relation between e.g. elements of the second information. Different functions may be adapted to be performed on different types of information, such as in the situation where different types of data packets give rise to different types of information in the second information. Alternatively, the different functions may provide different results on the basis of the same, second information. Often a combination of the two is desired.

The overall aim is to preferably provide the same third information for data packets of the same flow but different third information for data packets of different flows.

In one situation, different functions are different types of hash functions performed on the second information.

Applying a function on information will mean performing the function using the third information as input. This input may be as a single input, such as a single value, or may be as a plurality of inputs, if desired.

The outputting of the third information and at least part of the data packet may be outputting a combined data item comprising both the third information and the at least part of the packet, or may be the outputting thereof in a plurality of data items, such as the third information as one data item and the at least part of the data packet as a data item. Depending on e.g. a bandwidth of reception of the data packets and the outputting of the at least part of the data packet and the third information, it may be desired to only output part of the data packet in order to have sufficient bandwidth to also output the third information.

Naturally, any receiving of the data packet and the outputting of the third information and at least part of the data packet may be performed using the same or different bandwidths, protocols, standards, communication type (wired, wireless, Ethernet, Blue Tooth, IR, radio, or the like). It is noted that the communication on e.g. Ethernet/ISDN/ADSL cables and the like may very well differ from that on internal computer/PC/Server busses. Then, it need not be required that the third information and/or the at least part of the data packet conform to the same data type(s) required or desired at an input of the apparatus.

If one or more parts of the data packet are directly represented by the third information, for example, such parts need not be output, as they may be derived from the third information output.

In a preferred embodiment, the outputting means are adapted to further output information identifying the selected function. In this situation, information may be derived by an element receiving the third information, the at least part of the data packet and the identifying information also from the identifying information. For example, when the function is selected on the basis of a determined type of data packet, this type may then subsequently be determined solely from the identifying information, whereby any further processing may be performed on that basis without having to analyze the data packet (or the part thereof) at all.

In that or another embodiment, the apparatus further comprises means for holding user-defined information correlating each of a plurality of predetermined first information with one of the plurality of predetermined functions. Thus, depending on the actual situation, as will be described in further detail below, the user may him/herself define the use of functions in relation to the first information. The apparatus may further comprise means for the user to enter such information, such as a keyboard, a computer mouse, a touch pad/screen, a microphone for receiving spoken instructions, or the like.

In one situation, the data packet is an Ethernet packet. It is noted that "Ethernet package" is an umbrella for multiple types of data packet standards, including several different types of encapsulations, but in general, the accessing means may then be adapted to output as at least part of the first information, information relating to any encapsulation(s) of the packet and/or which of a plurality of predefined types of Ethernet packet the data packet is. Thus, the first information then primarily relates to the type of packet, such as which types of information are provided in the packet and, usually as a consequence thereof, where in the packet, the different types of information are provided. Then, the first information need not actually comprise any information directly copied from the data packet.

In a preferred embodiment, the apparatus further comprises a plurality of outputs, wherein the outputting means is adapted to, for a data packet, identify an output on the basis of the third information relating to the data packet and output the third information relating to the data packet and the at least part of the data packet on the identified output. An alternative would be to provide an element receiving, for all data packets, the third information and the at least part of the data packet, and being able to forward different sets of third information and at least part of the data packet to individual outputs as desired.

The reason for providing different outputs is illustrated in a second aspect of the invention, which relates to a data processing system comprising an apparatus according to the first aspect of the invention, the system further comprising a plurality of processing elements, wherein the outputting means are adapted to identify, on the basis of the data packet and/or the first, second and/or third information, a processing element and to output the at least part of the data packet and the third information to the identified processing element.

In general, multiple processing elements may be used, when a single processing element is not able to perform the tasks intended.

Thus, the processing element, or output, is identified for each data packet, and the pertaining third information and at least part of the data packet is then transmitted to the identified processing element.

The processing performed in the processing elements may be a further analysis of the at least part of the data packet, where this analysis may be based also on the third information.

Alternatively, the processing may be a forwarding thereof on one of a number of outputs, the storage thereof and/or any of a large number of other tasks.

The processing elements may all be adapted to perform the same processing, so that the number of processing elements merely is an increase in performance. Then, the identification of a processing element for a data packet may be based merely on a load balancing analysis.

Alternatively, different processing elements may have different capabilities. Such different capabilities may be due to the processing elements being different in hardware and/or software (if software controlled). Thus, one processing element may be used for further processing data packets of certain types or of certain flows (with predetermined addresses, for example), and other processing elements may be used for performing other analysis, for storing data, or for forwarding elements.

In the situation where individual streams of data packets are identifiable, such as from the parts of the data packets and/or the third information, it may be ensured that packets of a stream are all forwarded to the same output or processing means and thus cannot overtake each other and thus get out of the sequence order.

In one situation, the outputting means are adapted to identify the processing element on the basis of the third information. In this situation, the processing element may be identified without having to derive additional information from the data packet.

In a particularly interesting embodiment, the apparatus is the abovementioned apparatus having a plurality of outputs, and wherein each processing element is adapted to receive the third information and the at least part of a data packet from a predetermined output. In this manner, the selection of an output indirectly is a selection of a processing element.

A third aspect of the invention relates to a method of analyzing a data packet, the method comprising:
   deriving and outputting, from the data packet, first and second information relating to the data packet,
   selecting, on the basis of the first information, one of a plurality of predetermined functions,
   deriving third information by applying the selected function to the second information, and
   outputting the third information together with at least part of the data packet
wherein the first information relates to a type of the data packet, a standard to which the data packet conforms and/or which data item(s) is/are present in the data packet.

As mentioned above, the analysis may be any type of analysis of a data packet, and the definition of data packet broadly is any type of data packet/element/item/cell/frame transmittable on a data network/trunk/link/cable/bus.

Again, the step of deriving and outputting the first and second information does not require full access to all parts of the data packet.

The selection of the function is based on the first information, and the first information may be any information derived directly from, such as copied from, the data packet or may be information describing the data packet, such as a type of data packet or a standard to which the data packet conforms and/or which types of data or information items are present or available from the data packet.

The first and second information may be the same but preferably is not. The first information relates to e.g. a type of data packet (preferably which types of data items are available for the analysis), and the second information preferably relates to data of the data packet, preferably data identifying a stream of data packets to which the data packet belongs.

The outputting of the third information and the at least part of the data packet may be the outputting of a single data element/item/packet/frame or the outputting of the third information and the at least part of the data packet separately (in time or as separate elements).

In one situation, the outputting step further comprises outputting information identifying the selected function. In this manner, a subsequent processing may, also or solely, be based on this information.

In that or another situation, the selecting step comprises selecting the function on the basis of user-defined information correlating each of a plurality of predetermined first information with one of the plurality of predetermined functions. Thus, the method may be adapted to specific situations and specific types of data packets or different compositions of data packet types. The method may also comprise the step of the user entering the user-defined information.

In one situation, the data packet is an Ethernet packet and wherein the deriving/outputting step comprises outputting as at least part of the first information, information relating to any encapsulation(s) of the packet and/or which of a plurality of predefined types of Ethernet packet the data packet is.

In that or another situation, the outputting step comprises, for a data packet, identifying one of a plurality of outputs on the basis of the third information relating to the data packet and outputting the third information relating to the data packet and the at least part of the data packet to the identified output.

As described above, this brings about a wide variety of possibilities in that the individual processes may be used for different purposes or for the same purpose, but where a load balancing and e sequence preservation is desired.

A fourth aspect of the invention relates to a method of operating the data processing system the second aspect of the invention, wherein the outputting step comprises identifying, on the basis of the data packet and/or the first, second and/or third information, a processing element and outputting the at least parts of the data packet and the third information to the identified processing element.

In this situation, the outputting step preferably comprises identifying the processing element on the basis of the third information, as this is a simple manner of performing the identification. In addition, when the second information and thus the third information is indicative or directly distinguishes between data streams, this will still provide the load balancing and/or the sequence preservation. Alternatively, the processing element may be identified by the actual function identified and used.

In addition, when the apparatus further has a plurality of outputs, the outputting step preferably comprises, for a data packet, identifying an output on the basis of the third information relating to the data packet and outputting the third information relating to the data packet and the at least part of the data packet on the identified output. This has the advantages described further above.

In general, the dynamic hash feature or selection facilitates the calculation of more evenly distributed hash values. This is very useable in systems where the calculated hash value is used to load balance the frames onto multiple CPUs. The different hash functions are numbered from 0 and upwards and will be referred to as hash mode in the following description.

The calculated hash value together with the selected hash mode can be used for different things like:
   Sending the frame together with the TAG to a specific CPU based on the hash value. I.e calculating a hash value for all frames received on the NIC and sending the frames+ TAG to 1-of-4 CPUs based on the two least significant bits of the hash value
   Accelerate the grouping of different frames and/or information from frames based on the hash value.
   Uniquely identify all frames for a single flow with a specific hash value, where a flow refers to all frames from a specific source address to a specific destination address. Since all frames for a specific flow has the same hash value and using load balancing to multiple CPU based on the least significant bits of the hash value results in a single CPU receiving all frames from the flow. This results in improved CPU memory cache performance since frames for the same flow is store consecutively in the CPU memory when transferred from the NIC to the CPU.

Figure 2:
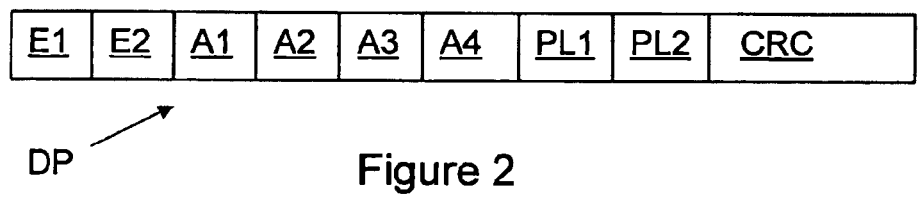
Figure 3:
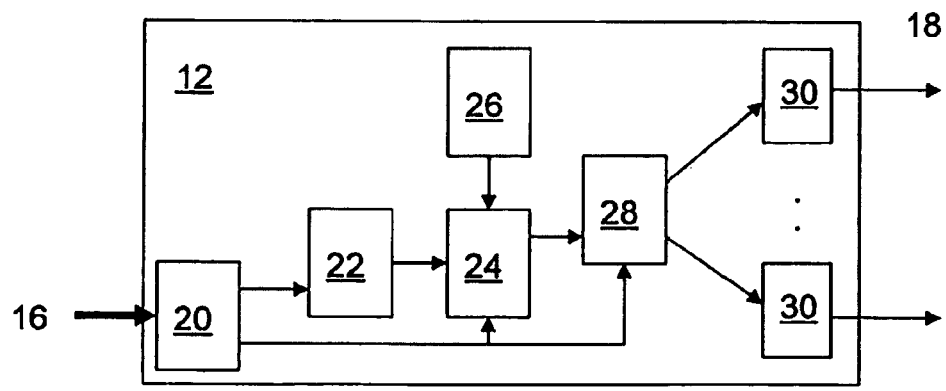
Figure 4:
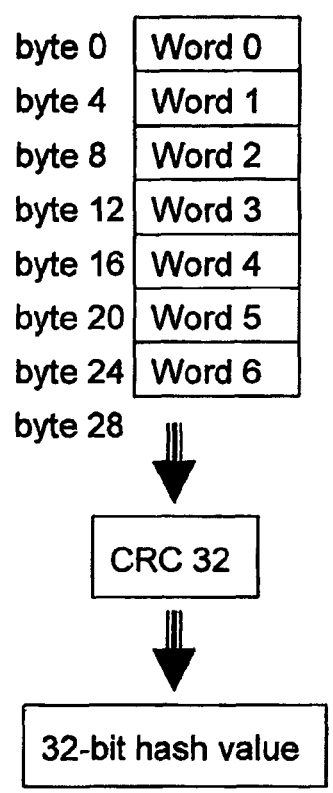
Figure 7:
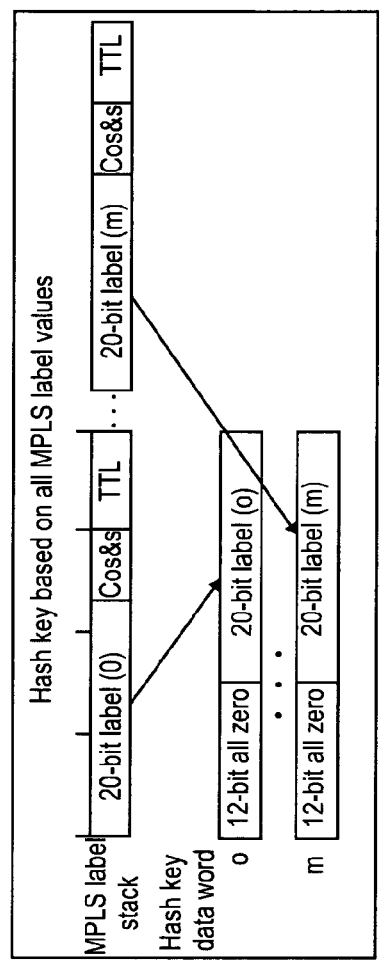
Figure 6:
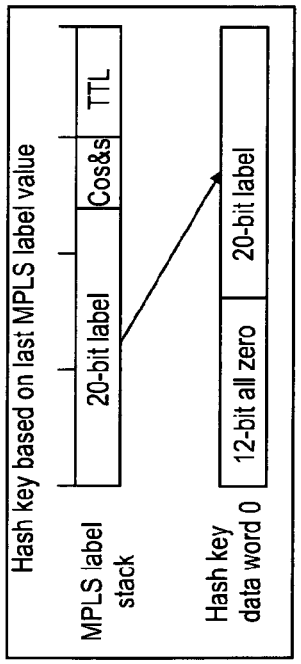
Figure 9:
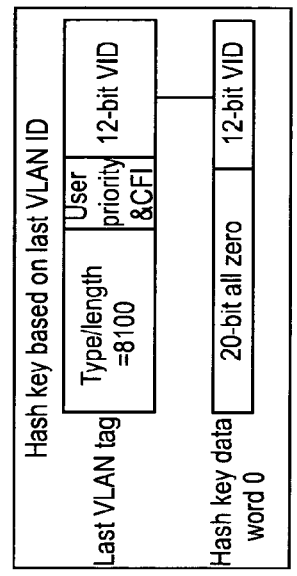
Figure 10:
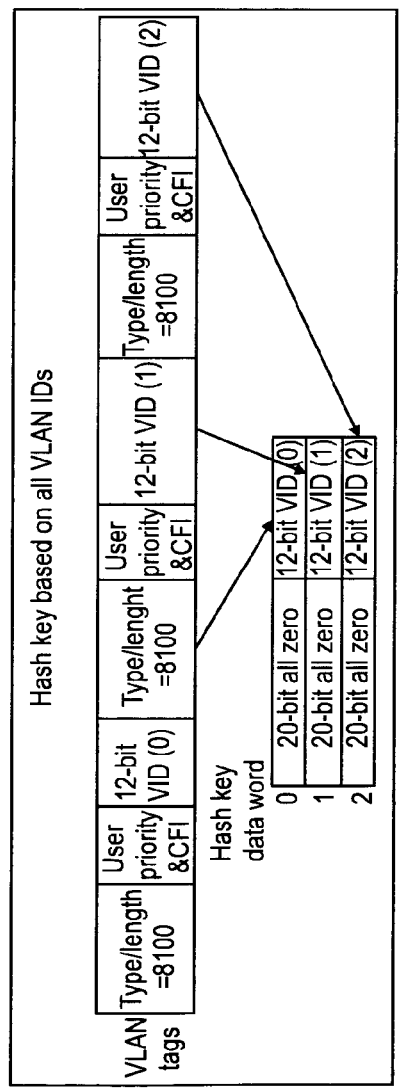
Figures 8, 11:
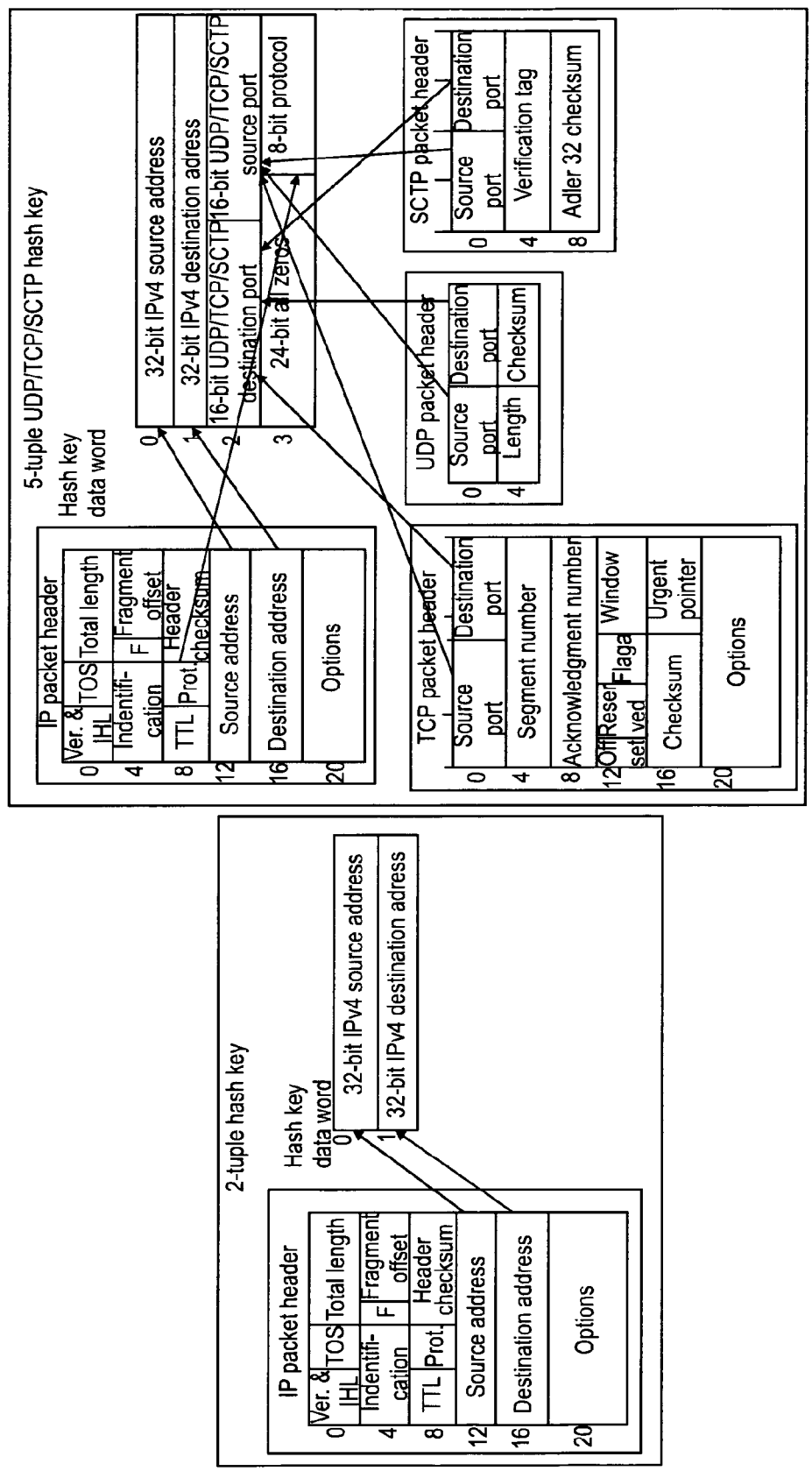
Figures 12, 13:
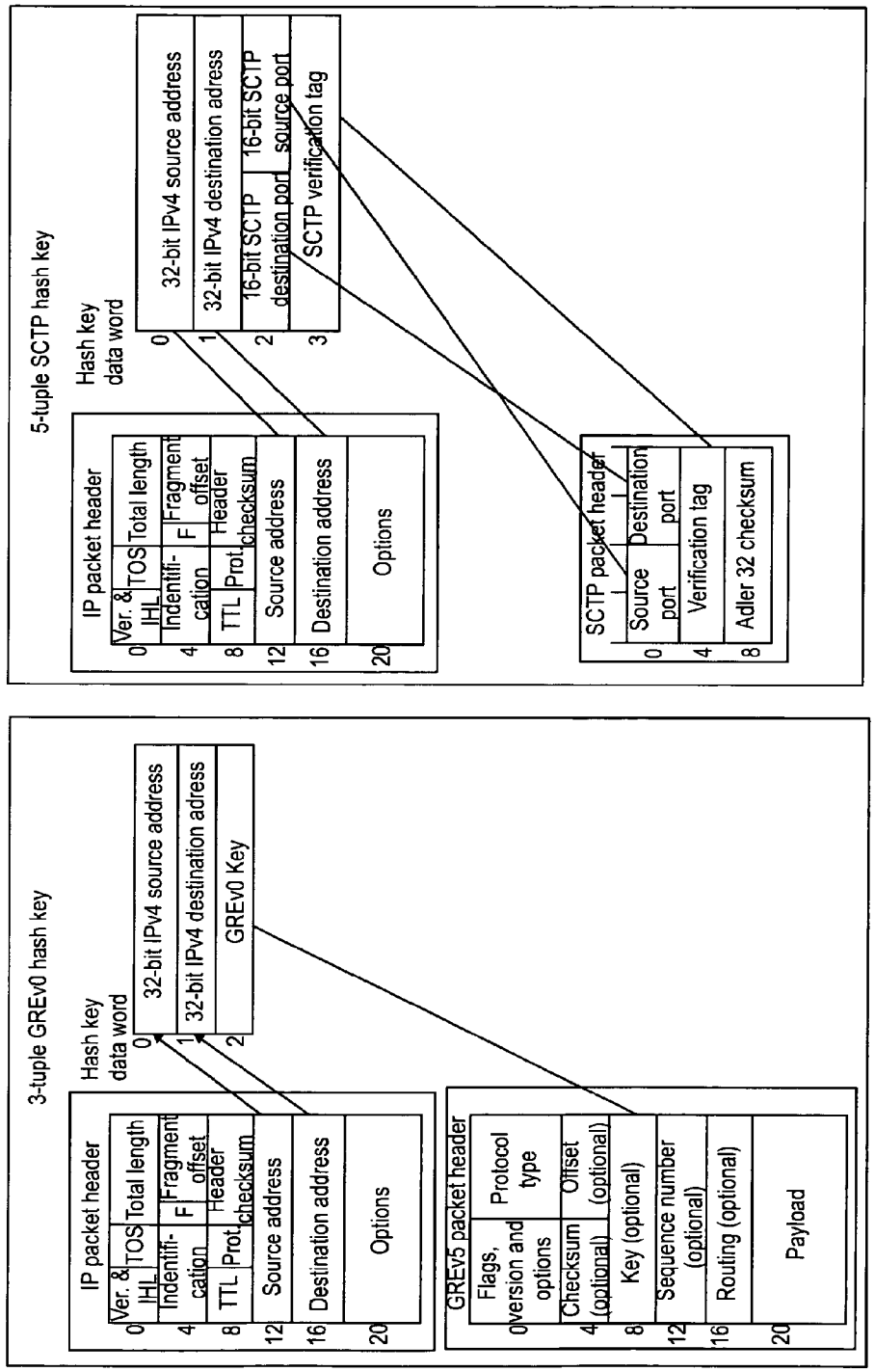
Figures 14, 15:
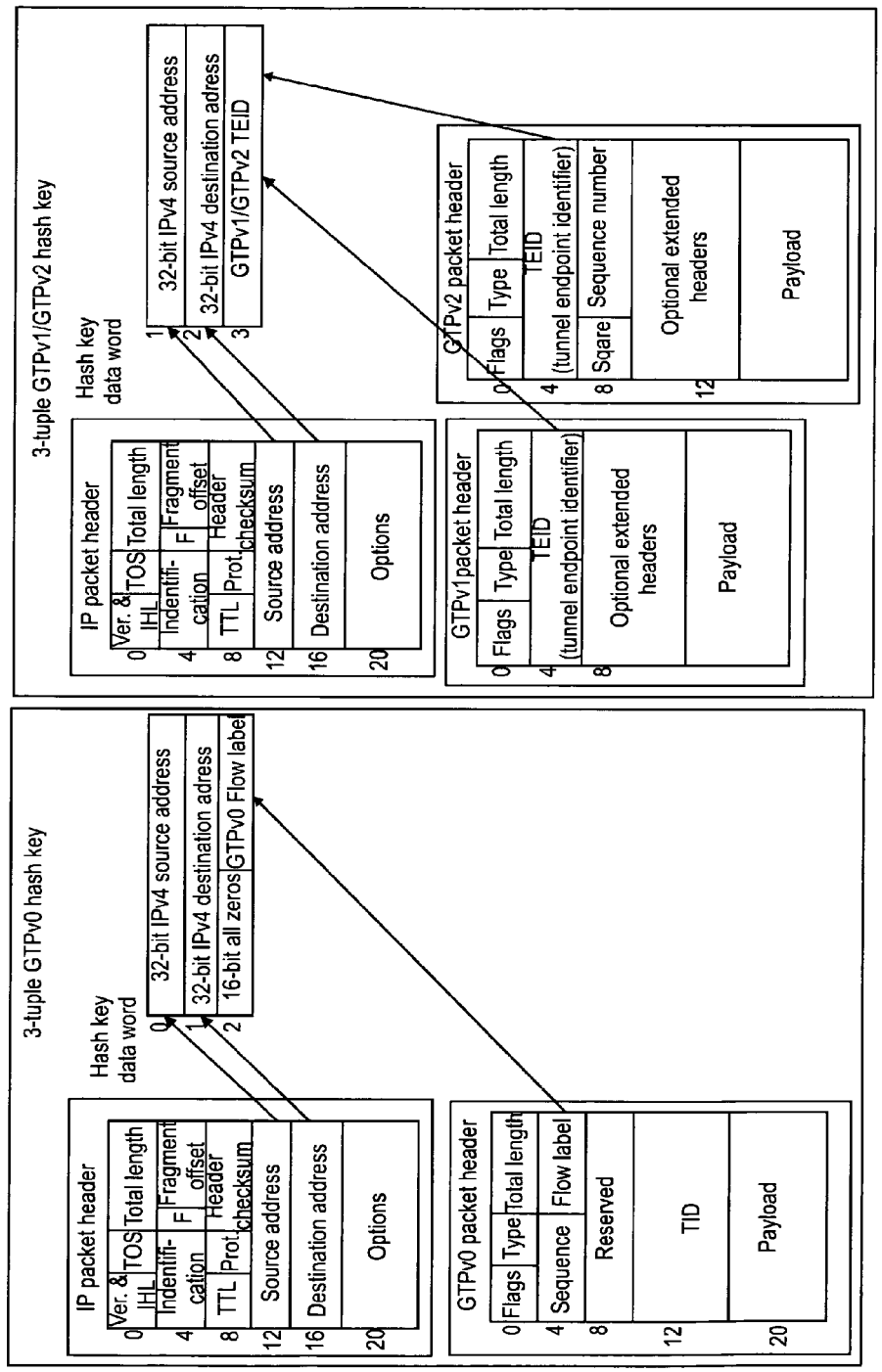

In the following, preferred embodiments of the invention will be described with reference to the drawing, wherein:
   FIG. 1 illustrates a data packet processing system with a data pre-processor
   FIG. 2 illustrates a structure of a data packet,
   FIG. 3 illustrates relevant parts of the data pre-processor of FIG. 1,
   FIG. 4 illustrates calculation of a hash value from a 7-word value, FIG. 5 illustrates the different hash functions and the data on which they are performed, FIG. 6 illustrates the "Last MPLS" hash key type, FIG. 7 illustrates the "All MPLS" hash key type, FIG. 8 illustrates "2-tuple" hash, FIG. 9 illustrates that data word 0 in the "Last VLAN" hash key type 7, FIG. 10 illustrates the "All VLAN" hash function or key type, FIG. 11 illustrates the "5-tuple UDP/TCP/SCTP" hash key type 8, FIG. 12 illustrates the "3-tuple GREv0" hash key type 10, FIG. 13 illustrates the "5-tuple SCTP" hash key type 12, FIG. 14 illustrates the "3-tuple GTPv0" hash key type 14, and FIG. 15 illustrates the "3-tuple GTPv1/GTPv2" hash key type 16.

In FIG. 1, the overall data processing system 10 comprises a data pre-processor 12, such as a Network Inspection Card (NIC), which receives a plurality of data packets on a communication link 16. The pre-processor 12 pre-processes the data packets and forwards each of these, together with information derived in the pre-processing, to one of a plurality of processors or processes 14, via links 18, which processors/processes 14 may perform further processing of the data packets.

In general, a system of this type may be a data storage or data traffic surveillance system receiving a large amount of data, in the form of data packets, on the link 16, which data is to be processed by the processors 14. Usually, the plurality of processors 14 is provided when a single processor does not suffice.

In the processors 14, the further processing of the data packets is performed in order to determine the further analysis, transmission, storage, altering of the data packet, or whatever the result of the final processing may be. The processors 14 may be used for analyzing the data traffic, for storing the data and/or for transmitting the data to other network elements, computers or the like, depending on the result of the processing in the processors 14.

In order to avoid having to perform the full data packet processing of the data packets in the, usually software controlled, processors 14, the result of the pre-processing performed in the pre-processor 12 is forwarded to the processors 14 together with the data packet or relevant parts thereof. If the result of the pre-processing uniquely defines part of the data packet, such parts of the data packet need not be forwarded to the processors 14 when identified in the result co-transmitted to the processors 14.

The overall function of the system is to process data packets and in particular flows of data packets. When two processors or computers interact, a flow of data packets is interchanged.

This flow may be a file transfer or an interchange of audio/video, such as Voice over IP. A flow is a sequence of data packets which are similar, and the belonging of a data packet to a flow is determinable, and it is desired that all data packets of a flow are handled by the same processor 14. Thus, the pre-processing aims at deriving the same information from all data packets in a flow, so that the processor 14 may identify the data packets of a flow from this derived information alone.

Thus, the loading of the processors 14 may be balanced by allocating flows to processors 14 depending on the loading of the processors. Also, or alternatively, by forwarding all data packets of the same flow to the same processor 14, it is avoided that individual data packets of a flow overtake others, so that e.g. a VoIP stream is interrupted or corrupted due to e.g. a delay in one processor 14. In addition, the processors 14 may have different properties or capabilities, which are adapted to the type of and number of data packets forwarded thereto. Different processors 14 may have different capabilities or programming if desired, so that data packets of different types should be forwarded to different processors 14.

In FIG. 2, a general structure of a data packet, DP, is seen. An Ethernet package may have one of a large number of structures, as a large number of individual data packet standards fall within the general term "Ethernet".

Ethernet data packets may be transported at layer 3 and/or layer 4. Layer 3 transport requires the data packet to have a layer 3 transmitter address and a layer 3 receiver address, and layer 4 the same. Thus, an Ethernet data packet, DP, may have a number of addresses A1-A4. In addition, the data packet may have a payload, PL, and error correcting data, CRC. A number of other fields or information types may be present, depending on the actual standard and type of data transmitted.

In addition, the packet DP may have different types of encapsulation, such as one or more MPLS and/or VLAN encapsulations, illustrated at E1 and E2, which are also identifiable at particular positions (bits) in the data packet DP.

Consequently, a flow may be identified from all of or some of the addresses A1-A4, but the positions thereof will differ from data packet type to data packet type, depending on a.o. the encapsulation(s), if any.

As the individual types of Ethernet packages are standardized, the skilled person will know these and be able to determine, from any data package, to which standard the packet applies and where in the data packet the individual types of data are presented.

In FIG. 3, the essential elements of the pre-processor 12 and the manner of operation thereof is seen. In this pre-processor, the data 16 is received in a receiver 20 which forwards the data packet DP to a deriving unit 22, a calculating unit 24, and an assembling unit 28. The deriving unit 22 derives relevant information from the data packet DP and forwards this to the calculating unit 24. This relevant information will uniquely, or at least with a high probability, identify the individual streams of data packets received and usually will relate to addresses in the data packets as well as other characteristics, such as which encapsulation(s) are present.

As is clear from FIG. 2, the positions in the data packet DP of the addresses (A1-4) and other information may vary due to whether the encapsulation data (E1-2) is present or not. Thus, the output of the deriving unit 22 may be information as to which type of data packet, DP, the packet is as well as whether any encapsulation(s) is/are present and/or positions at which the address data, A1-A4, is found in this particular data packet DP.

Depending on the data type of a flow, also other information than address information may be used, such as port addresses or numbers, verification data, verification data or other data identifying, such as to a receiving computer, that this data packet is part of a stream.

This information, which may be in the form of bit positions in the data packet or the below 9 bit value, is forwarded to the calculating unit 24, the function of which is to derive the information characterizing the data packet DP and which is to be forwarded to the processors 14. The calculating unit 24 also receives the data packet DP and accesses a data store 26 holding user-defined information correlating data packet type and a function for calculating the derived information from the relevant parts of the data packet DP.

In the data store 26, each of a number of hash functions (20 are described further below) are related to one or more different types of data packet DP or different types of relevant information, such as if encapsulations are present, and if so, which, whether the data packet is a Layer 3, Layer 4 data packet and the like. Together with the hash function, the data store 26 also holds information relating to on which parts of the data packet DP, the hash function is to be performed in order to derive the information characterizing the data packet.

Thus, calculating unit 24 derives from the data store 26 the correct hash function as well as information relating to on which parts of the data packet, the function is to be performed. Then, the hash function is performed (the calculating unit 24 also receives the data packet) and the result of the hash function is output to a combining unit 28 also receiving the data packet.

Finally, the combining unit 28 outputs the data packet and the result of the hash function to an output element 30 adapted to communicate with a processor 24. The output element 30, and subsequent processor 14, may be selected in a number of manners, such as from the result of the hash function or an ID of the hash function. As is described further above, different processors 14 may have different properties, but at least it is desired that the same processor receives all data packets of the same stream/flow.

It is preferred that the calculating unit also outputs information relating to which hash function was used to the combining unit 28 which then also outputs this information to the output 30 and the processor 14. This ID of the hash function in itself will indicate to the processor 14 which type of data is in the data packet without the processor 14 having to analyze the packet itself. In addition, reducing the amount of data by calculating a hash function always entails the risk that data packets of two different flows have the same result and then are confused or mixed up. By the providing of also the ID of the hash function, it will be possible to further reduce the probability of this problem.

More precisely, the preferred implementation is one in which:

1. The received frame is classified based on encapsulation and protocol resulting in a 9 bit value.

The bits of the 9 bit value are determined by:

| Bit | Look-up Addresses | Description |
| --- | --- | --- |
| 0 | MPLS | 0: No MPLS Label |
|   |   | 1: More than 0 MPLS label |
| 1 | VLAN | 0: No VLAN tag |
|   |   | 1: More than 0 VLAN tag |
| 3:2 | L3 Types | 0: IPv4 |
|   |   | 1: IPv6 |
|   |   | 2: IPX |
|   |   | 3: Others |
| 6:4 | L4 Types | 0: TCP |
|   |   | 1: UDP |
|   |   | 2: ICMP |
|   |   | 3: Others |
|   |   | 4: GREv0 |
|   |   | 5: SCTP |
|   |   | 6: Configurable |
|   |   | 7: Configurable |
| 8:7 | L4port | 0: Others |
|   |   | 1: GTPv0-U |
|   |   | 2: GTPv1v2-C |
|   |   | 3: GTPv1-U |

2. The 9 bit value is then used as the address in a user defined lookup table with 512 entries where each entry consists of a 5 bit hash mode value, i.e. 1-out-of-32 possible different hash functions. Thus, the user is able to determine which hash functions are used for each individual of the 9 bit values:

| # | Hash function type | Use with |
| --- | --- | --- |
| 0 | Invalid | Default |
| 1 | Reserved | |
| 2 | Last MPLS | (MPLS labels > 0) |
| 3 | All MPLS | (MPLS labels > 0) |
| 4 | 2-tuple | (L3 = IPv4) |
| 5 | 2-tuple sorted | (L3 = IPv4) |
| 6 | Last VLAN | (VLAN tags > 0) |
| 7 | All VLAN | (VLAN tags > 0) |
| 8 | 5-tuple | (L3 = IPv4) && (L4 = TCP/UPD/SCTP) |
| 9 | 5-tuple sorted | (L3 = IPv4) && (L4 = TCP/UPD/SCTP) |
| 10 | GREv0 | (L3 = IPv4) && (L4 = GREv0) |
| 11 | GREv0 sorted | (L3 = IPv4) && (L4 = GREv0) |
| 12 | SCTP | (L3 = IPv4) && (L4 = SCTP) |
| 13 | SCTP sorted | (L3 = IPv4) && (L4 = SCTP) |
| 14 | GTPv0 | (L3 = IPv4) && (L4port = GTPv0-U) |
| 15 | GTPv0 sorted | (L3 = IPv4) && (L4port = GTPv0-U) |
| 16 | GTPv1v2 | (L3 = IPv4) && (L4port = GTPv1-U ‖ GTPv1v2-C) |
| 17 | GTPv1v2 sorted | (L3 = IPv4) && (L4port = GTPv1-U ‖ GTPv1v2-C) |
| ... | Undefined | results in invalid hash value |
| 31 | Round-Robin mode | Any |

A more specific description of these functions is given in FIG. 5 and further below.

In case of error during the hash value calculation the hash value is set to zero and the frame tagged with an invalid hash value bit. The frame is still also tagged with the hash mode value to be used in error handling. An error may occur due to:
  Undefined hash mode
  Protocol error due to too short a packet to contain required protocol.
  Fields used in the hash function is not contained in the packet since the packet is to short.

3. The selected hash function from the lookup table is then used to calculate a hash value for the data packet/frame.

Naturally, different hash values can be calculated based on the packet header information. Presently, the hash values are generated as the IEEE 802.3 MAC CRC32 checksum (polynomial: $G(x)=x32+x26+x23+x22+x16+x12+x11+x10+x8+x7+x5+x4+x2+x+1$) of 28 bytes of hash key data as shown in FIG. 4.

If the type cannot be determined, for example, a round robin result is provided simply providing each such data packet with a number increasing for each data packet.

4. Each frame is tagged with the hash mode as well as the hash value.

5. The grouping of each frame into a {hash mode, hash value} tuple can be used in different ways as described above.

An overview of the data used in the different hash functions is given in FIG. 5. Words not used for a specific hash mode are set to zero during calculation.

Some of these hash functions will now be described in more detail.

FIG. 6 illustrates the hash key or relevant information derived from a data packet which is MPLS encapsulated/tagged and thus has a "1" in the first bit of the 9 bit value. In such situation, the "Last MPLS" hash key type is used, whereby the look-up table is set up accordingly, and it is seen from FIG. 6 that the first word of the hash key data word (word 0) is the 20 bit label field of the last MPLS label stack in the data packet or frame. The remaining words of the hash key and the remaining bits of word 0 are set to zero.

FIG. 7 illustrates the hash key or relevant information derived from another data packet which is MPLS encapsulated/tagged. In this situation, the "All MPLS" hash key type is used, and it is seen from FIG. 7 that the first word of the hash key data word (word 0) is the 20 bit label field of the first MPLS label stack in the data packet or frame, and that the subsequent words hold the subsequent MPLS labels. The remaining words of the hash key and the remaining bits of MPLS-label holding words are set to zero.

FIG. 8 illustrates the "2-tuple" hash, and it is seen from FIG. 8 that the first two words of the hash key data word (words 0 and 1) are the 32 bit Ipv4 source and destination addresses, respectively. The remaining words of the hash key are set to zero.

This function, as well as a number of the other hash functions mentioned, may also be sorted, whereby the highest of the source and destination address is provided in word 0 and the other in word 1. In this manner, data packets transmitted between two computers will have the same hash key, which may be desired.

FIG. 9 illustrates that data word 0 in the "Last VLAN" hash key type 7 is set to the 12-bit VLAN ID field of the last VLAN tag in the data packet. The remaining words of the hash key and the remaining bits of word 0 are set to zero.

FIG. 10 illustrates the "All VLAN" hash function or key type and illustrates that the individual 12-bit VLAN ID fields are each provided in a word, starting with word 0. The remaining words of the hash key and the remaining bits of words with the 12-bit VLAN IDs are set to zero.

FIG. 11 illustrates the "5-tuple UDP/TCP/SCTP" hash key type 8 which is useful both for UDP, TCP and SCTP data packets. It is seen that the IPv4 addresses and protocol are derived and introduced. From the protocol, it may be determined which type of data packet is represented in word 2, where source and destination ports of the TCP, UDP or SCTP packet is provided.

FIG. 12 illustrates the "3-tuple GREv0" hash key type 10 where the 32 bit IPv4 addresses are derived as well as the 32-bit GREv0 key.

FIG. 13 illustrates the "5-tuple SCTP" hash key type 12 where the 32 bit IPv4 addresses are derived for words 0 and 1, and where the 16-bit SCTP source and destination ports are derived for word 2. Finally, the 32-bit verification tag is entered in word 3.

FIG. 14 illustrates the "3-tuple GTPv0" hash key type 14 where the 32 bit IPv4 addresses are derived for words 0 and 1, and where the 16-bit GTPv0 flow label is introduced in word 2.

Finally, FIG. 15 illustrates the "3-tuple GTPv1/GTPv2" hash key type 16 where the 32 bit IPv4 addresses are derived for words 0 and 1. Word 2 then receives the Tunnel Endpoint Identifier, TEID, of the GTPv1 or GTPv2 packet.

The invention claimed is:

1. An apparatus for analyzing a data packet, the apparatus comprising:
a deriving unit configured to access data of the data packet and output first and second information relating to the data packet,
a calculating unit configured to, on the basis of the first information, select one of a plurality of predetermined functions, and derive third information by applying the selected function to the second information, and
an output element configured to output the third information together with at least part of the data packet,
wherein the deriving unit is configured to output the first information relating to a type of the data packet, a standard to which the data packet conforms and/or which data item(s) is/are present in the data packet,
the apparatus further comprising a plurality of outputs, wherein the output element is configured to, for a data packet, identify an output on the basis of the third information relating to the data packet and output the third information relating to the data packet and the at least part of the data packet on the identified output.

2. The apparatus according to claim 1, wherein the output element is configured to further output information identifying the selected function.

3. The apparatus according to claim 1, further comprising a data store configured to hold user-defined information correlating each of a plurality of predetermined first information with one of the plurality of predetermined functions.

4. The apparatus according to claim 1, wherein the data packet is an Ethernet packet and wherein the deriving unit is configured to output as at least part of the first information, information relating to any encapsulation(s) of the packet and/or which of a plurality of predefined types of Ethernet packet the data packet is.

5. A data processing system comprising an apparatus according to claim 1, the system further comprising a plurality of processing elements, wherein the output element is configured to identify, on the basis of the data packet and/or the first, second and/or third information, a processing element and to output the at least parts of the data packet and the third information to the identified processing element.

6. The data processing system according to claim 5, wherein the output element is configured to identify the processing element on the basis of the third information.

7. The data processing system according to claim 5, wherein the apparatus is an apparatus according to claim 5 and wherein each processing element is adapted to receive the third information and the at least part of a data packet from a predetermined output.

8. A method of analyzing a data packet, the method comprising:
deriving and outputting, from the data packet, first and second information relating to the data packet,
selecting, on the basis of the first information, one of a plurality of predetermined functions,
deriving third information by applying the selected function to the second information, and
outputting the third information together with at least part of the data packet,
wherein the first information relates to a type of the data packet, a standard to which the data packet conforms and/or which data item(s) is/are present in the data packet, and
wherein the outputting step comprises, for a data packet, identifying one of a plurality of outputs on the basis of the third information relating to the data packet and outputting the third information relating to the data packet and the at least part of the data packet to the identified output.

9. The method according to claim 8, wherein the outputting step further comprises outputting information identifying the selected function.

10. The method according to claim 8, wherein the selecting step comprises selecting the function on the basis of user-defined information correlating each of a plurality of predetermined first information with one of the plurality of predetermined functions.

11. The method according to claim 8, wherein the data packet is an Ethernet packet and wherein the deriving/outputting step comprises outputting as at least part of the first information, information relating to any encapsulation(s) of the packet and/or which of a plurality of predefined types of Ethernet packet the data packet is.

12. A method of analyzing a data packet according to claim 8, wherein the outputting step comprises identifying, on the basis of the data packet and/or the first, second and/or third information, a processing element and outputting the at least parts of the data packet and the third information to the identified processing element.

13. The method according to claim 12, wherein the outputting step comprises identifying the processing element on the basis of the third information.

14. The method according to claim 12, wherein the apparatus further has a plurality of outputs, and wherein the outputting step comprises, for a data packet, identifying an output on the basis of the third information relating to the data packet and outputting the third information relating to the data packet and the at least part of the data packet on the identified output.

* * * * *